United States Patent Office 3,138,840
Patented June 30, 1964

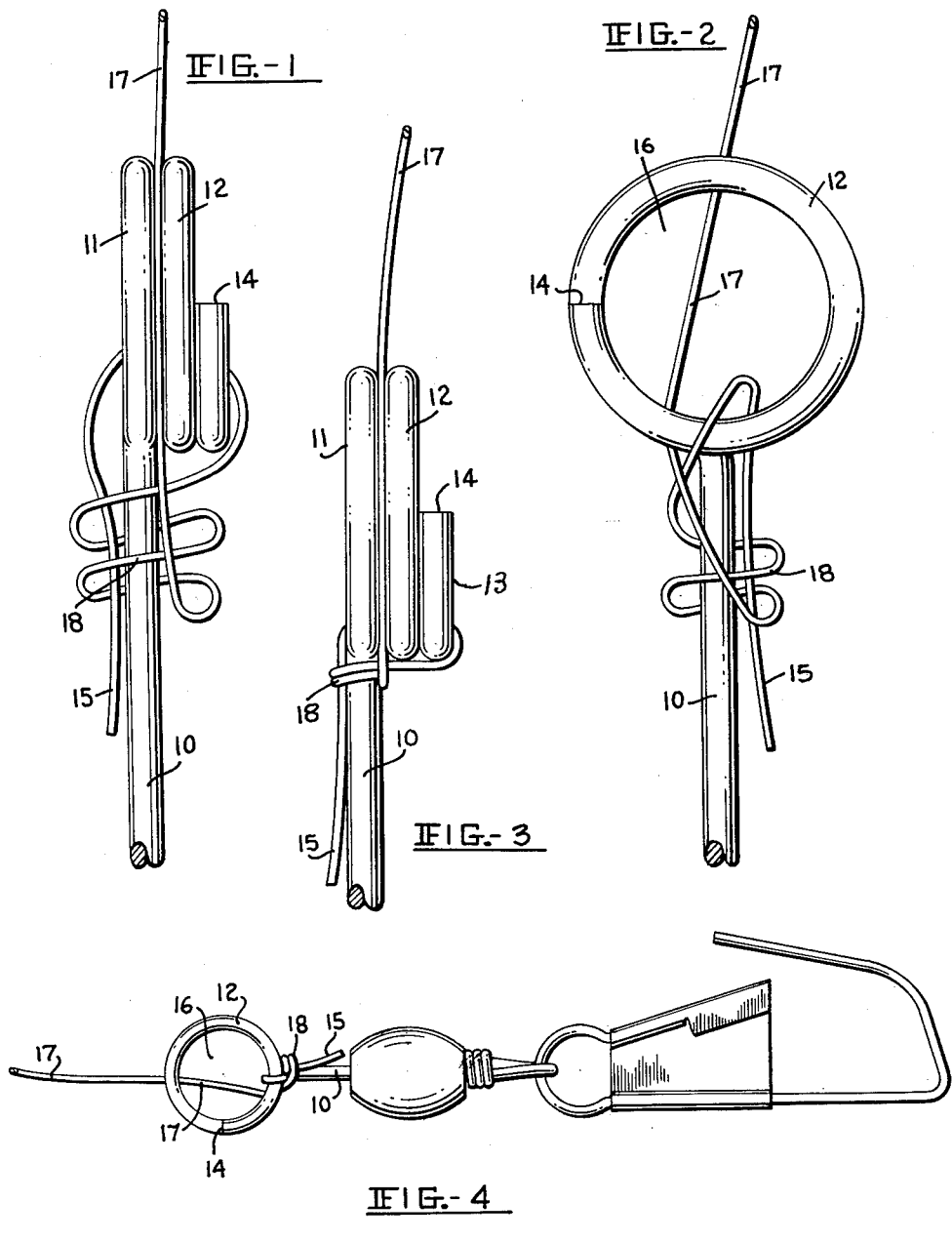

3,138,840
FISH HOOK ATTACHING DEVICE
Alva E. Rich, P.O. Box 198, Lapel, Ind.
Filed May 27, 1963, Ser. No. 283,428
4 Claims. (Cl. 24—131)

This invention relates to means for attaching a fish hook, including leaders and swivels and the like to a line. The invention is particularly useful in attaching a hook to a monofilament line which causes considerable difficulty in making a secure connection when it is attempted to be connected to a hook by tying the line in knots. The present invention makes it possible for the monofilament line to be attached to a hook simply by wrapping an end portion around the hook's shank and then drawing it between loops of the shank provided at an end thereof removed from the hook proper. A very secure attachment is obtained in this manner, wherein the line will remain secured to the hook by any pull within its tensile strength, the line normally parting in a length not involved in the actual attachment to the hook when that strength is exceeded. Also the line may be readily disengaged from the shank.

These and many other objects and advantages of the invention will become apparent to those versed in the art in the following description of one particular form of the invention as illustrated in the accompanying drawing, in which FIG. 1 is a view of the line as initially applied to the shank, with the line in loose wrapped condition diagrammatically illustrating the procedure;

FIG. 2 is a view of the shank end line portion illustrated in FIG. 1, the shank being rotated ninety degrees from the position there shown;

FIG. 3 is a view of the shank in the position illustrated in FIG. 1 with the line pulled tautly into its final securing condition; and FIG. 4 is a view of a line attached to the shank of a swivel normally carrying a hook clasp.

The fish hook not herein shown in the drawing but of any standard shape and size, the fish hook shank being selected as one particular example of a shank usable in the invention, has a straight shank portion 10 and instead of having the usual single eye portion at the terminal end of the shank, there are provided a number of loops approximately circular in shape, and concentrically aligned to be tensioned in contact one with the other, these loops being designated by the numerals 11, 12, and 13. There are the two full loops 11 and 12, and the loop 13 is substantially only a quarter of a turn in respect to its end 14 being spaced from the shank 10 itself. It is to be noted that the end 14 is spaced around and upwardly from the shank 10 so that it will not interfere with the applying and releasing of the line. The initial loop 11 is carried in its initial portion in alignment with the shank 10 as illustrated in FIG. 1.

The dimensions of the loops, in respect to their diameters, as well as to their individual cross-sectional area, will vary depending upon the size of the hook and in turn upon the size of the line desired to be employed. Likewise the lateral tension of one loop against the other will vary in accordance with the line size, being increased for heavier or thicker lines as compared to lighter lines, and particularly as compared to the monofilament line which is extremely difficult to tie to a hook as above indicated and using the ordinary knots.

Referring particularly to FIGS. 1 and 2, the illustration is in more or less diagrammatic form in order to have the line clearly represented in its respective turns.

Initially an end portion of the line 15 is inserted through the central opening 16 of the loops 11, 12, and 13, and is brought around to extend downwardly along the shank 10. Preferably the end portion 15 is inserted from that side of the loops on which the loop portion 13 is presented.

Holding the end portion 15 along the shank 10, the line proper designated by the numeral 17 is wrapped around the shank 10 and the end portion 15 at least two complete turns, and then the line 17 is carried upwardly along the shank over these turns generally designated by the numeral 18 and is drawn upwardly to enter between the two adjacent loops 11 and 12, which loops will spring apart to permit that entrance, so that the line 17 may extend across the space 16 from the lower portions of the loops 11 and 12 and emerge from therebetween at their uppermost sides. All that needs to be done then is to pull the line 17 upwardly to bring the turns 18 snugly against the shank 10 and the line 15 imposed therealong, whereupon the attachment is completed, and no slippage is permitted of the end portion 15. In that final operation of pulling on the line 17, the attachment of the line is represented in FIG. 3.

By reversing the action described, the line 17 may be pulled to the left as viewed in FIG. 2, releasing it from between the loops 11 and 12, and then the line may be unwound around the shank 10 to release the end portion 15, and the line then may be removed entirely from the shank and the loops.

Therefore it is to be seen that an extremely simple and yet most effective attachment of the line may be made, particularly in the dark should one be fishing either before sunrise or during the night, and also it is to be seen that even though the line is to be detached in the dark for replacement of the hook or other fishing lure or attachment to be desired, the line may be readily removed, all by sense of feel, particularly since the end 14 will locate that side of the loops toward which the line will be pulled from around between the loops 11 and 12 for disengagement. Preferably the line 17 will be given a number of turns around the shank 10 and end portion 15 in a direction which will bring the line 17 around to that side of the loops 11 and 12 as indicated in FIGS. 1 and 2, so that the line can be brought up to align itself between the two loops 11 and 12 in the groove naturally a turn therebetween and circumferentially therearound due to the fact that the loops are circular in cross-section.

While I have herein described and illustrated my invention in the one particular form, it is obvious that structural changes may be made, such as employing a greater number of initial turns of the line, and employing additional shank loops for side compression against the line therebetween, and therefore I do not desire to be limited to that precise form beyond the limitations which may be imposed by the following claims.

I claim:

1. A fishing line securement comprising the combination with
    a substantially rigid shank extending by a length from a member to be connected with the line;
    a coiled end portion of the shank comprising a plurality of side by side concentric loops elastically pressing sidewise one against the other and terminating in a free end;
    a line;
    one end length of the line extending through the opening defined by the loops and lying lengthwise along said shank adjacent said loops;
    there being a plurality of turns of the line extending around the shank and said line end length holding that end length against the shank; and
    said line extending from its turn fartherest removed from turn said loops back between the loop leading directly from said shank and the next adjacent loop and approximately diametrically across and between opposite portions of the same loops to emerge therefrom;

tension on the line away from the loops moving and compacting said turns and the said line end length along said shank against said loops on the sides opposite from said line emergence.

2. The structure of claim 1 in which
the longitudinal axis of said shank is aligned with a diameter of said shank coiled end portion; and
said loops elastically bearing one against the other.

3. The structure of claim 2 in which said free end terminates approximately a quarter of a turn from said shank.

4. The method of securing a line to a shank member having a plurality of concentric, side by side loops elastically bearing one against another and extending from an end portion of the shank, which method comprises inserting one end portion of the line transversely freely through all the loops and bringing the portion down along said shank member;

winding the line a number of turns around the shank over said line end portion; and pulling the line approximately diametrically between and across adjacent loops and continuing pulling said turns to compressively engage said end portion against said shank and said loops.

References Cited in the file of this patent

UNITED STATES PATENTS

| 128,526 | Blackstone | July 2, 1872 |
| 545,992 | Weiss | Sept. 10, 1895 |
| 578,762 | McMahon | Mar. 16, 1897 |
| 1,062,365 | Schulte | May 20, 1913 |
| 2,033,701 | Gibbs | Mar. 10, 1936 |
| 2,569,312 | Holm | Sept. 25, 1951 |
| 3,043,615 | Dannehanm | July 10, 1962 |